United States Patent
Hephner et al.

(10) Patent No.: US 10,406,612 B2
(45) Date of Patent: Sep. 10, 2019

(54) SKID STEER CUTTING ATTACHMENT

(71) Applicants: Matthew J. Hephner, Powell, TN (US); Matthew C. Hephner, Knoxville, TN (US)

(72) Inventors: Matthew J. Hephner, Powell, TN (US); Matthew C. Hephner, Knoxville, TN (US)

(*) Notice: Subject to any disclaimer, the term of this patent is extended or adjusted under 35 U.S.C. 154(b) by 0 days.

(21) Appl. No.: 15/852,919

(22) Filed: Dec. 22, 2017

(65) Prior Publication Data

US 2018/0178297 A1 Jun. 28, 2018

Related U.S. Application Data

(60) Provisional application No. 62/439,087, filed on Dec. 26, 2016.

(51) Int. Cl.
| | |
|---|---|
| *E01C 23/09* | (2006.01) |
| *B28D 1/04* | (2006.01) |
| *B23D 47/02* | (2006.01) |
| *B23D 45/02* | (2006.01) |
| *B28D 7/02* | (2006.01) |
| *B23D 59/02* | (2006.01) |
| *B23D 47/10* | (2006.01) |
| *B23D 47/12* | (2006.01) |

(52) U.S. Cl.
CPC .......... *B23D 47/02* (2013.01); *B23D 45/028* (2013.01); *B23D 47/10* (2013.01); *B23D 47/12* (2013.01); *B23D 59/025* (2013.01); *B28D 1/042* (2013.01); *B28D 1/045* (2013.01); *B28D 7/02* (2013.01); *E01C 23/09* (2013.01)

(58) Field of Classification Search
CPC ...... E01C 23/09; E01C 23/0933; B28D 1/045

USPC .................. 299/39.1, 39.3; 125/13.01, 13.03
See application file for complete search history.

(56) References Cited

U.S. PATENT DOCUMENTS

| | | | | |
|---|---|---|---|---|
| 2,673,725 | A * | 3/1954 | Coates | B23D 59/002 144/43 |
| 4,310,198 | A * | 1/1982 | Destree | B23D 47/005 125/14 |
| 5,669,371 | A * | 9/1997 | Rupprecht | B27B 9/00 125/12 |
| 6,203,112 | B1 * | 3/2001 | Cook | E01C 23/0933 125/13.01 |

(Continued)

FOREIGN PATENT DOCUMENTS

| | | |
|---|---|---|
| BE | 1005826 A3 * | 2/1994 |
| KR | 20130112095 A * | 10/2013 |
| WO | WO 2006123481 A1 * | 11/2006 |

OTHER PUBLICATIONS

Korean document KR 2016115524 A, , 3 pages, (Year: 2016).*

*Primary Examiner* — Sunil Singh
(74) *Attorney, Agent, or Firm* — Knox Patents; Thomas A. Kulaga (57) ABSTRACT

Cutting apparatus attachable to a skid steer. The apparatus includes a house attached to a skid steer. The house is attached to an arm, which is attached to a motor that drives a blade. A single hydraulic circuit originating from the skid steer powers both the motor and a cylinder that is capable of pivoting the arm or rotating a guard that partially surrounds the blade. The user is able to operate the motor and cylinder independently of one another. The cutting apparatus is capable of cutting a straight line on horizontal, raised, and vertical surfaces.

17 Claims, 6 Drawing Sheets

(56) References Cited

U.S. PATENT DOCUMENTS

| | | | | |
|---|---|---|---|---|
| 6,470,874 | B1* | 10/2002 | Mertes | B23D 47/12 |
| | | | | 125/12 |
| 9,039,098 | B2* | 5/2015 | Fanslow | E01C 23/09 |
| | | | | 299/39.3 |
| 9,259,849 | B2 | 2/2016 | Hilsgen et al. | |
| 2008/0017182 | A1 | 1/2008 | Hilsgen et al. | |
| 2010/0308640 | A1* | 12/2010 | Haroldsen | E01C 23/088 |
| | | | | 299/39.6 |

* cited by examiner

SKID STEER CUTTING ATTACHMENT

CROSS-REFERENCE TO RELATED APPLICATIONS

This application claims the benefit for Provisional Application No. 62/439,087, filed Dec. 26, 2016.

STATEMENT REGARDING FEDERALLY SPONSORED RESEARCH OR DEVELOPMENT

Not Applicable.

BACKGROUND

1. Field of Invention

This invention pertains to rotary cutters. More particularly, this invention pertains to hydraulically-powered concrete cutters that attach to skid steers.

2. Description of the Related Art

Hard materials, such as concrete pavement, asphalt, wood, aluminum, and other metals, are often cut with large, hydraulically-powered blades that are attached to skid steers.

During the cutting process water is constantly applied to the blade to prevent overheating, control dust, and assist in clearing out the cutting area. The resulting water, debris, and mud often spatters across the front of the skid steer, blocking vision and putting the operator in danger. The hazard from debris also makes it virtually impossible for an operator to effectively cut a raised surface such as a concrete pipe, or a vertical surface such as a wall.

A recent skid steer attachment for cutting slabs is disclosed in U.S. Pat. No. 9,259,849 by Hilsgen et al. Hilsgen discloses a slab cutter with a boom attached to a skid steer. A trolley with a cutting blade is attached to the underside of the boom. The boom includes front feet that rest on the ground during use. When the boom feet rest on the ground, the trolley blade cuts a straight line in the slab along the length of the boom. The entire boom is then lifted, moved forward, and placed down for the next cutting line.

Another recent slab-cutting device is taught in U.S. Pat. No. 9,039,098 by Fanslow. Fanslow discloses a platform affixed to a skid steer. A vertical column attaches a cutting blade to the platform, directly below the platform. The operator is able to move the blade side to side, up and down, or rotate the blade about a vertical axis.

The Hilsgen and Fanslow skid steer attachments may be appropriate for cutting pavement under certain circumstances but do not fully address many of the collateral concerns related to cutting hard surfaces. For example, Hilsgen does not cut a line of uniform depth if there is an uneven cutting surface between the skid steer and the front of the boom. Likewise, the depth of Fanslow's cut line is directly dependent upon the ground surface gradient at the skid steer front wheels, which are not near Fanslow's blade. Fanslow's blade depth can be adjusted, but only by interrupting the cutting process and manually adjusting the blade stop by loosening and re-tightening the bolts. As another collateral issue, Hilsgen's cutter requires that cutting be done in discrete intervals, by cutting a line, lifting the entire boom and setting down in a new section, and starting the cutting process again. Another limitation of both Fanslow and Hilsgen is that their devices have limited ability to cut a vertical structure or an irregular structure such as a pipe. Another limitation of both Fanslow and Hilsgen is that their devices offer no safe method for the user to climb into the front entrance of a skid steer.

BRIEF SUMMARY

According to one embodiment of the present invention, an attachment for a skid steer is provided. The attachment includes a house, a blade, an arm, a cylinder, a motor, and a guard. The arm couples the blade to the house. The guard is coupled to the blade and covers a portion of the blade. The motor powers the blade.

In one embodiment, the house is configured to attach to the front of a skid steer such that the house rests on the ground. The arm couples the blade to the house. The arm is coupled to the cylinder. The cylinder is double actuating and configured to raise and lower the arm. The cylinder controlling the arm and the motor powering the blade operate independently of one another. In some embodiments, the cylinder controlling the arm and the motor powering the blade are powered by the same hydraulic circuit, which originates from the skid steer. The hydraulic circuit includes a flow regulator that limits the speed that the cylinder lowers the arm. The hydraulic circuit includes a release valve that reduces the downward maximum force that the cylinder is capable of exerting on the arm.

The blade is proximate the leading end of the house such that the blade is capable of being in a vertically fixed position relative to the leading end of the house as the house moves over terrain. Thus, the blade cuts into the ground at a consistent depth as the leading end of the house moves over the ground.

In some embodiments, the downward force of the weight of the house and its coupling to the skid steer overcomes any torque on the arm caused by the spinning blade contacting an uncuttable material. Thus, the house rests on the ground even when the blade meets resistance or binds while cutting, and thus the cut line maintains a uniform depth.

In some embodiments, the house includes a channel. The channel extends from the top of the house to the bottom of the house. In some embodiments, the channel also extends to the front of the house. The arm and blade are coupled to the house such that at least a portion of the blade is inside the channel when the blade is in contact with the ground. Thus, the horizontal center of the blade is capable of being positioned proximate the leading end of the house.

The house, guard and arm are collectively interposed between the front of the skid steer and the ground contact area of the blade. Thus, the operator of the skid steer is protected from flying debris created when the blade is cutting into the ground. In some embodiments, at least a portion of the guard is inside the channel when the blade is in contact with the ground.

In another embodiment, the arm, blade, and house are in a fixed position relative to one another. The skid steer includes a lift, and the house is coupled to the lift such that the house is moved vertically when the lift is activated. Thus, the skid steer's lift raises and lowers the blade.

The cylinder is coupled to the guard. The cylinder is double actuating. The guard is configured to move in an arc around a portion of the blade when the cylinder is actuated. The cylinder rotating the guard, the motor powering the blade, and the lift moving the house operate independently of one another. In some embodiments, the cylinder rotating the guard, the motor powering the blade, and the lift moving the house are hydraulically powered. The cylinder rotating the guard and the motor powering the blade are powered by the same hydraulic circuit, which originates from the skid steer.

The guard is capable of being rotated such that it is interposed between the front of the skid steer and the surface area being cut by the blade. Thus, the guard protects the skid steer operator from flying debris caused by the blade cutting, regardless of whether the blade is cutting horizontally (e.g., along the ground), vertically (e.g., along a wall), or some combination thereof (e.g., a raised concrete pipe).

In many embodiments, a single hydraulic circuit powers both the double-acting cylinder and the motor that spins the blade.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

Skid steer attachment for cutting is disclosed. The skid steer attachment is generally indicated as 100, with particular embodiments and variations shown in the figures and described below having an alphabetic suffix, for example, 100-A or 100-B.

Various components are illustrated both generically and specifically in the figures and in the following description. For example, the houses 102-A, 102-B are discussed individually and separately to ensure clarity when describing the configuration of each skid steer attachment 100-A, 100-B. The house 102, when referred to collectively, is referenced without the alphanumeric suffix.

Figure 1:
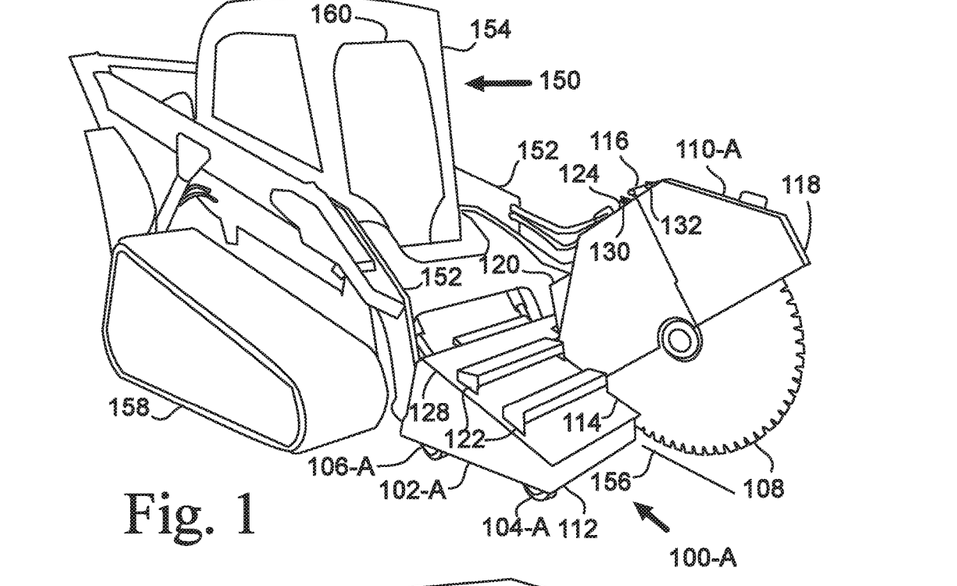
FIG. 1 is a right front perspective view of an embodiment of a skid steer attachment attached to a skid steer.
Figure 2:
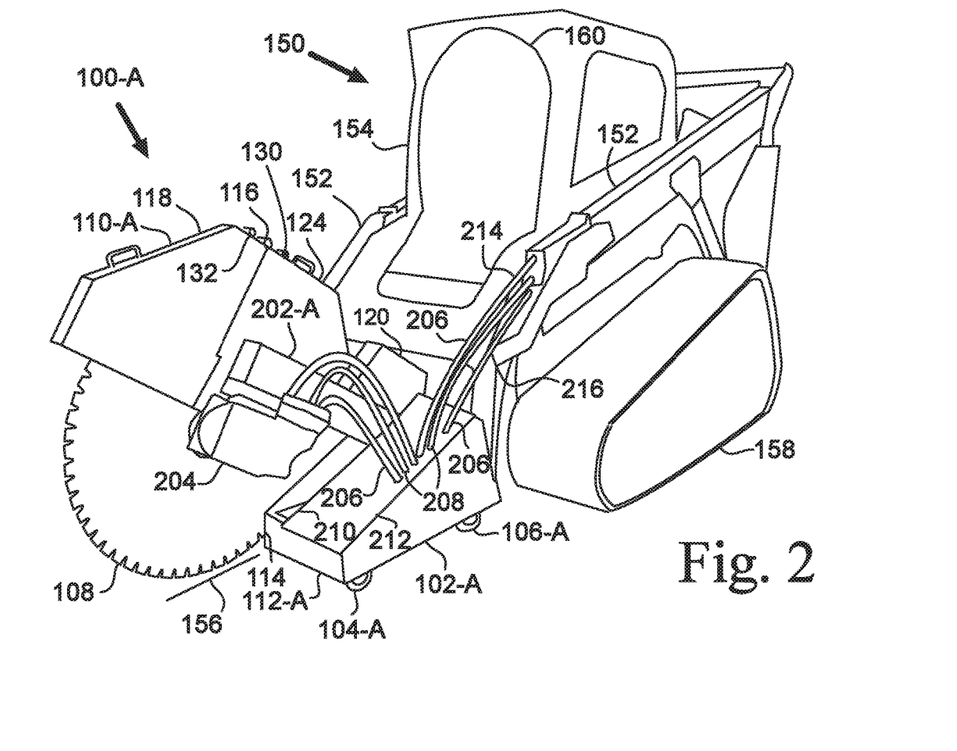
FIG. 2 is a left front perspective view of the skid steer attachment embodiment of FIG. 1 attached to a skid steer.

FIGS. 1 and 2 illustrate an attachment 100-A mounted on a skid steer 150. The skid steer 150 is a rigid-frame, engine-powered mobile machine with lift arms 152 suitable for attaching a wide variety of tools and attachments. The skid steer 150 often has one or more hydraulic circuits 206, which include a pressure line 214 and return line 216, that are capable of powering and controlling the tool and attachments. In other embodiments, the attachment 100 is connected to a mobile machine, such as a tractor, that provides access to hydraulic power for operating the attachment 100.

The displayed skid steer 150 uses tracks 158 to move. Other skid steers use wheels, and the attachment 100 is compatible with both. The tracks 158 operate independently of one another, thereby allowing the skid steer 150 to turn by operating the tracks 158 at different speeds.

The attachment 100-A includes a house 102-A, a blade 108, and a guard 110-A for the blade. The house 102-A is coupled to the lift arms 152 of the skid steer 150. The skid steer 150 is operated to raise and lower the lift arms 152. The skid steer lift arms 152 are capable of lifting the entire attachment 100-A off the ground, if necessary, for the operation of the attachment 100-A.

The house 102-A includes a set of wheels 104-A, 106-A that support the attachment 100-A on the ground 156. The wheels 104-A, 106-A are oriented in parallel with the tracks 158 of the skid steer 150, such that the house 102-A is capable of moving in the same direction as the skid steer 150. The wheels 104-A, 106-A are metal. Thus, if the skid steer 150 performs a sharp turn, the wheels 104-A, 106-A are capable of sliding across the ground if necessary. Alternatively, the entire house 102-A is lifted by the lift arms 152 during a sharp turn.

The house 102-A includes a channel 114 that extends to the leading end 112-A of the house 102-A. The channel 114 is wide enough to accommodate a portion of the blade 108 and guard 110-A. Thus, the blade 108 is able to contact the ground 156 at a location proximate the leading end 112-A of the house 102-A.

An arm 202-A couples the house 102-A to a blade 108. The blade 108 is a circular cutting tool that rotates. In other embodiments, the house 102-A is coupled to other removal tools such as impact, crushing, or drill devices. The outer edge of the blade 108 engages the ground 156 or other material to be cut. The blade 108 is connected to a motor 204 that rotates the blade 108. The motor 204 is attached to the arm 202-A that is connected to the house 102-A. The arm 202-A allows the blade 108 to move vertically with respect to the ground 156 supporting the house 102-A.

Figure 3:
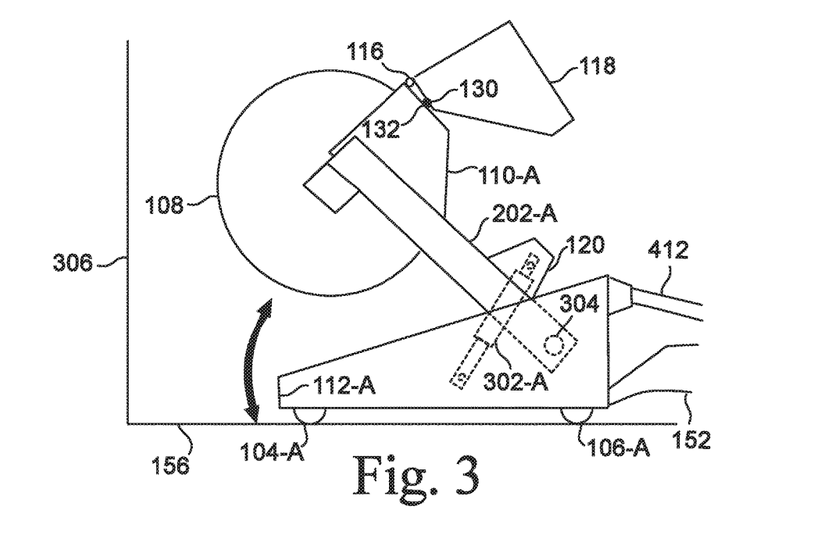
FIG. 3 is a left side view of portions of an embodiment.

As seen in FIG. 3, the blade 108 contacts the ground 156 substantially proximate to the leading end 112-A of the attachment 100-A. Thus, the blade 108 cutting depth remains substantially consistent, even as the leading wheels 104-A and leading end 112-A travel over uneven terrain.

The motor 204 is driven by hydraulic fluid flowing through the auxiliary hydraulic circuit 206. In other embodiments, the motor 204 is electric, gas, or pneumatically powered. The motor 204 is connected to a drain line 208.

The guard 110-A covers an exposed portion of the blade 108. The guard 110-A includes a front portion 118 and a rear portion 124. The two portions 118, 124 are connected with a hinge 116. The hinge 116 allows the front portion 118 of the guard 110-A to tilt back, thereby exposing a large part of the blade 108. In the displayed embodiment, during use the guard 110-A is in a fixed position relative to the blade 108, arm 202-A, and motor 204. The guard 108 is wide enough to span substantially the entire width of the channel 114, thereby blocking cutting debris from reaching the front 154 and entrance 160 of the skid steer 150.

The portions 118, 124 are together when the front portion 118 of the guard 110-A is lowered. When the front portion 118 of the guard 110-A is lowered, the front portion 118 covers a sufficient portion of the blade 108 such that the front portion 118 would assist in blocking the blade 108 from rolling away from the attachment 100-A if the blade 108 were to suddenly decouple from the arm 202-A during use.

The guard 110-A and the house 102-A are collectively interposed between the front 154 of the skid steer 150 and the contact area where the blade 108 meets the ground 156. Thus, the skid steer operator is shielded from flying debris and water when the blade 108 is operating, and dust and mud will collect less quickly across the front 154 of the skid steer 150.

The motor 204 and cylinder 302 are each powered by a single hydraulic auxiliary circuit 206, which originates from, and is driven by, the skid steer 150.

The house 102-A includes a recess 210, which is configured to receive the arm 202-A when the blade 108 is cutting the ground 156. A portion of the cylinder 302-A is inside an alcove 120, which allows the cylinder 302-A to contract sufficiently to lower the arm 202-A completely flush with the recess 210 and lower the blade 108 such that the motor 204 is adjacent to the ground 156. The house 100-A slopes downward from the skid steer 150, thereby allowing the skid steer 150 operator to view the blade 108 and nearby ground 156 to be cut during operation.

The house 102-A includes steps 122 on the top surface that allows the user to walk safely up the top of the house 102-A and into the front entrance 160. The steps 122 lead to the front entrance 160. The steps allow the operator easier access to the attachment 100 and its connections to the skid steer 150 during operation. The top of the steps 122 are covered with a non-slip strips. In another embodiment, the top of the steps 122 are a non-slip grid.

The house 102-A slopes upward from the front 112-A. However, the steps 122 are interposed between the blade contact area 156 and the front entrance 160, and function to block debris from reaching the front 154 of the skid steer 150. In some embodiments, the steps 122, the guard 110-A, and the house 102-A collectively block the cutting debris sufficiently that a glass or Plexiglas door covering is not required for the front entrance 160.

As shown in FIG. 3, the arm 202 pivots on a pin 304. The arm 202-A is moved by a cylinder 302. The cylinder 302 is double-acting, thereby allowing the blade 108 not only to be raised but also to press down with a force greater than its weight when cutting into a material.

The house 102-A is coupled to the lift arms 152 of the skid steer 150. The lift arms 152 operate to vertically move the attachment 100-A. The attachment 100-A is also coupled to the skid steer 150 via double acting cylinders 412, which operates to temporarily rotate the entire attachment 100-A if needed, when the blade 108 is not spinning.

FIG. 3 illustrates the front portion 118 of the guard 110-A tilted back and exposing the front of the blade 108. The front portion 118 and back portion 124 of the guard 110-A are affixed together with hitch pin receivers 130, 132. The blade 108 is sufficiently exposed to cut a vertical surface 306.

In one method for cutting a vertical surface 306, the arm 202-A is lowered such that the blade 108 is proximate but not touching the ground surface 156. During cutting of the vertical surface 306 the blade 108 is moved primarily by lifting and lowering the arm 202-A, and driving the skid steer 150 forward and backward. Other non-horizontal surfaces 414 can also be cut by raising the front portion 118 of the guard 110-A.

Figure 4:
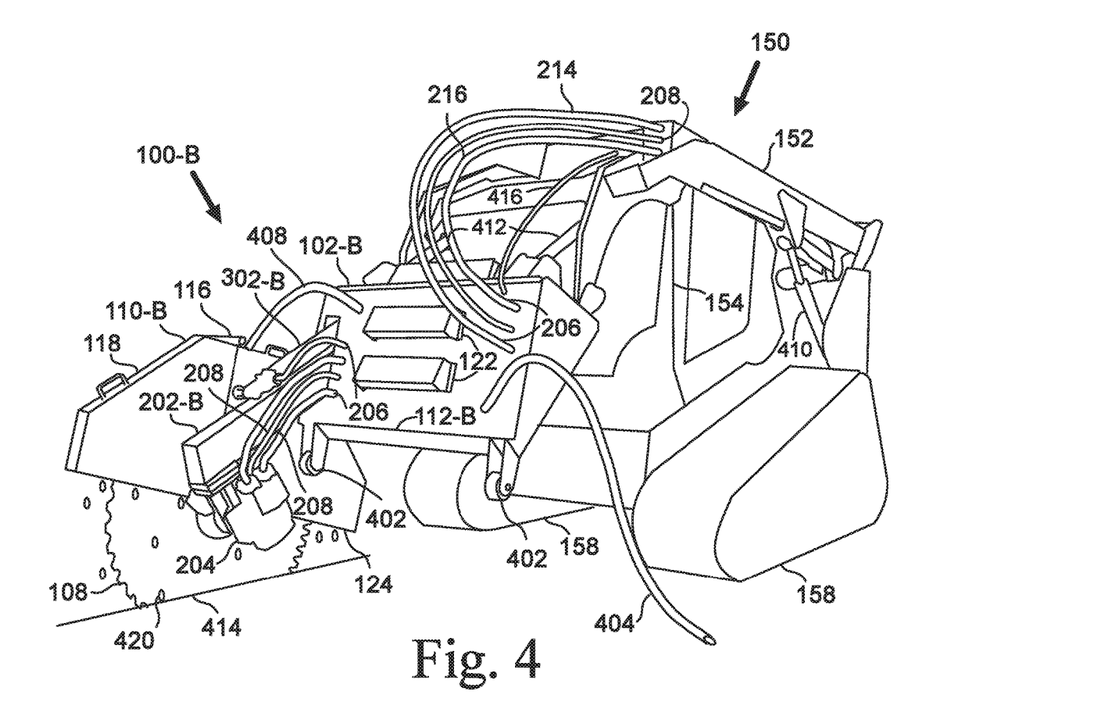
FIG. 4 is a left front perspective view of an embodiment of another skid steer attachment attached to a skid steer.

FIG. 4 illustrates a second embodiment of the attachment 100-B attached to the skid steer 150. The attachment includes a house 102-B. The house 102-B is coupled to the lift arms 152 of the skid steer 150. The lift arms 152 are raised and lowered by double-acting cylinders 410, and operate to vertically move the attachment 100-B. The attachment 100-B is also coupled to the skid steer 150 via double acting cylinders 412, which operate to rotate the entire attachment 100-B.

An arm 202-B affixes the house 102-B to the blade 108. The arm 202-B, house 102-B, and motor 204 are in fixed positions relative to each other. Thus, the blade 108 moves in a fixed position relative to the house 102-B as the house is rotated by the double-acting cylinders 412 or moved vertically by the lift arms 152.

The leading end 112-B of the house 102-B includes a pair of wheels 402. The wheels 402 extend past the leading end 112-B of the house 102-B. The wheels 402 allow the house 102-B to move laterally if lowered to the ground. The wheels 402 also allow the house 102-B to be wheelbarrowed when it is decoupled from the skid steer 150.

The guard 110-B includes a front portion 118 and a rear portion 124. The two portions 118, 124 are connected with a hinge 116. The hinge 116 allows the front portion 118 of the guard 110-B to tilt back, thereby exposing a large part of the blade 108.

When the front portion 118 of the guard 110-B is lowered, the front portion 118 covers a sufficient portion of the blade 108 such that the front portion 118 would block the blade 108 from rolling away from the attachment 100-B if the blade 108 were to suddenly decouple from the arm 202-B while cutting the ground 414.

The guard 110-B is configured to rotate around the blade 108. One end of the double-acting cylinder 302-B is attached to the guard 110-B, while the other end is attached to the arm 202-B. When the double-acting cylinder 302-B extends, the guard 100-B rotates forward. When the double-acting cylinder 302-B retracts, the guard 100-B rotates rearward. Thus, the operator of the skid steer 150 is able to interpose the guard 110-B between the front 154 of the skid steer 150 and the contact area between the blade 108 and the material 414 being cut.

The control for the double-acting cylinder 302-B is independent from the control for the motor 204. In the displayed embodiment, however, the motor 204 and double-acting cylinder 302-B are powered by the same auxiliary hydraulic circuit 206 that originates from the skid steer 150. A cable 416 extends from the skid steer 150 to the attachment 100-B. The cable 416 carries signals for controlling the flow of the hydraulic circuit 206 that powers both the motor 204 and the double acting cylinder 302-B attached to the guard 108.

A water line 404 is coupled from a water source (not shown) to the house 102-B. A second water line 408 extends from the house 102-B to the top of the guard 110-B. In some embodiments, the house 102-B includes a operator-controlled valve (not shown) for regulating the flow of the water supply to the second water line 408. In one embodiment, the valve (not shown) is preconfigured to activate water flow through the water line 408 whenever the motor 204 to turn the blade 108 is activated.

Water 420 flows from the top of the inside of the guard 110-B over the blade 108. Thus, the cutting material 414 and blade 108 is cooled and washed with water 420 during the cutting process.

Figure 5:
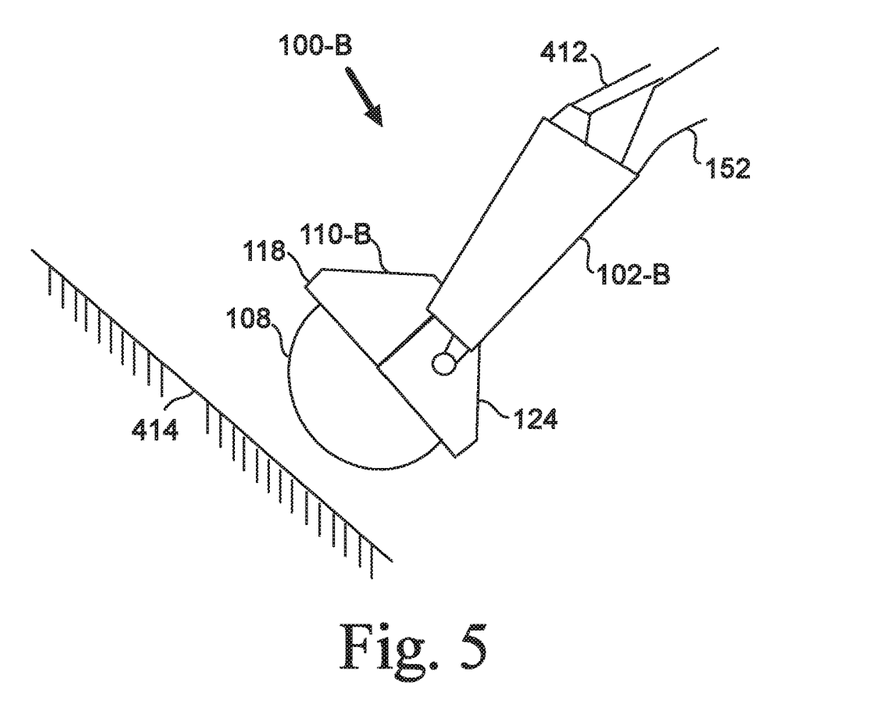
FIG. 5 is a simplified version of an embodiment cutting a raised surface.

FIG. 5 illustrates the attachment 100-B used for cutting a material 414 that is raised above the ground. The guard 110-B is rotated back toward the skid steer 150 to expose the blade 108 more fully to the material 414. The guard 110-B is interposed between the front 154 of the skid steer 150 and the area where the blade 108 will contact the material 414, thereby shielding the skid steer 150 and its operator. The blade 108 is positioned by the skid lift arms 152, the rotation of the attachment 100-B using the attached double acting cylinders 412, and driving the skid steer 150 itself backward and forward. Note that, even though the material 414 is at an angle, the guard 110-B prevents the blade 108 from rolling away if the blade 108 decouples during cutting.

Figure 6:
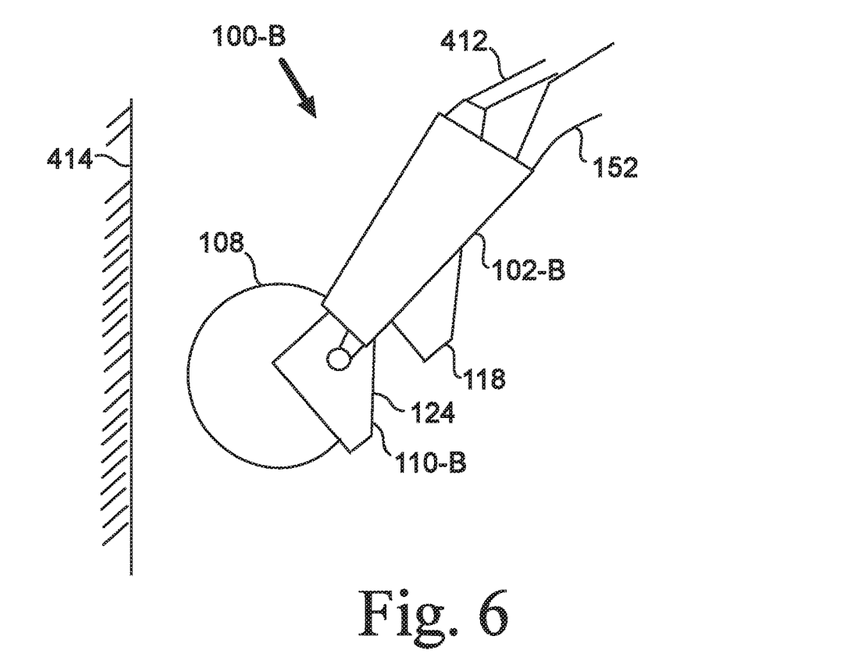
FIG. 6 is a simplified version of an embodiment cutting a vertical surface.

FIG. 6 illustrates the attachment 100-B used for cutting a material 414 that is vertical. The front 118 of the guard 110-B is attached to the rear of the guard 110-B with a hinge 116. The guard 110-B is interposed between the front 154 of the skid steer 150 and the area where the blade 108 will contact the material 414, thereby shielding the skid steer 150 and its operator. The guard front 118 is pivoted on the hinge 116 and flipped backward, thereby fully exposing the front portion of the blade 108 to the material 414. The blade 108 is positioned by the skid lift arms 152, the rotation of the attachment 100-B using the attached double acting cylinders 412, and driving the skid steer 150 itself backward and forward.

Figure 9:
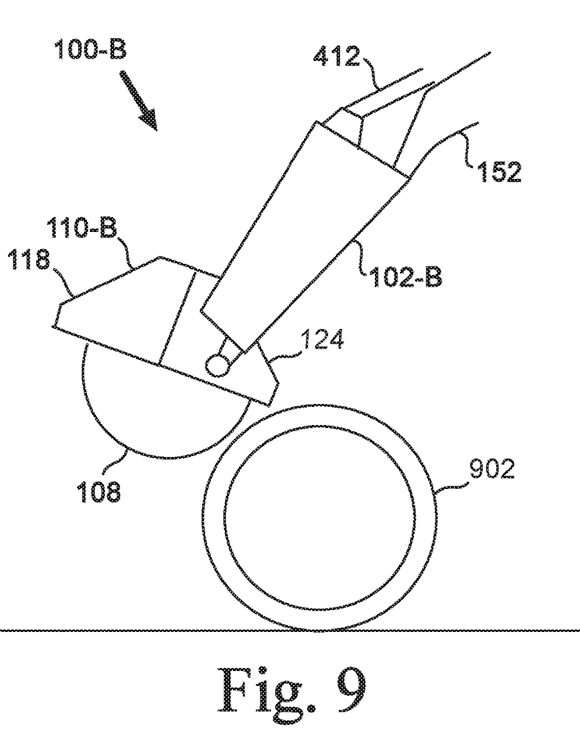
FIG. 9 is a simplified version of an embodiment cutting a pipe.

FIG. 9 illustrates the attachment 100-B reaching over a pipe 902 from to cut the pipe 902 from the side of the pipe 902 that is opposite the skid steer 150. Guard 110-B is pivoted in order to expose the rear portion of the blade 108 that contacts and cuts the pipe 902, while still shielding the skid steer entrance 160 from the contact area between the blade 108 and pipe 902. The blade 108 is positioned by the skid lift arms 152, the rotation of the attachment 100-B using the attached double acting cylinders 412, and driving the skid steer 150 itself backward and forward.

Figure 7:
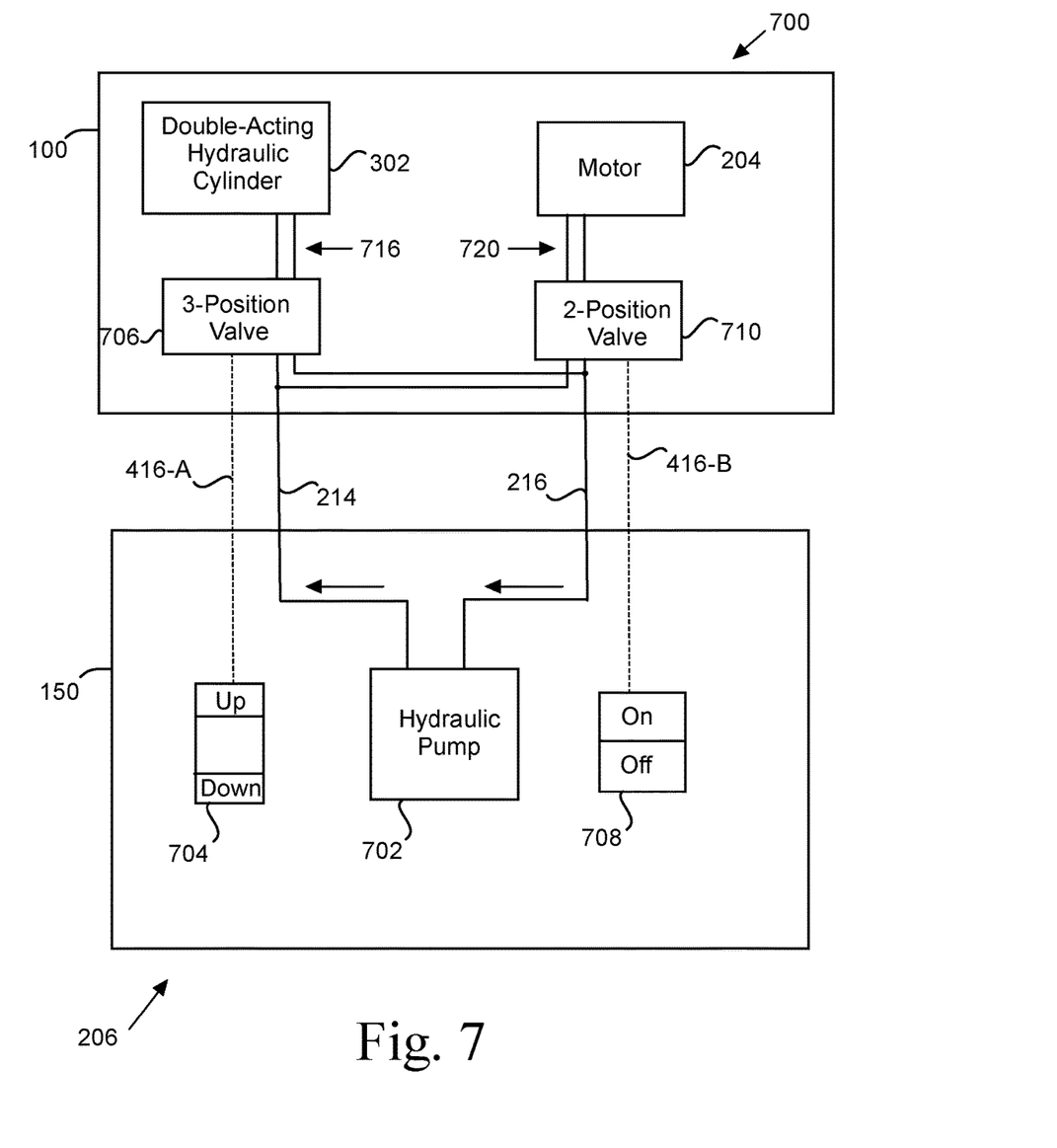
FIG. 7 is a simplified diagram of an electrical and hydraulic control system for an embodiment.

FIG. 7 illustrates an embodiment of a simplified control diagram 700 for the attachment 100 and skid steer 150. The simplified schematic does not illustrate various connections, for example, power and ground connections to the various components; however, those skilled in the art will recognize the need for such wiring and understand how to wire such a circuit, based on the components ultimately selected for use.

The diagram 700 is equally applicable to the first two displayed attachments 100-A, 100-B. The skid steer 150 includes a hydraulic pump 702 that powers both the motor 204 and the double-acting cylinder 302. A switch 704 is electrically coupled 416-A to a 3-way valve 706 that controls the hydraulic flow of the circuit 716 to the double-acting cylinder 302. The switch 704 is a momentary 3-position switch that defaults to a rest position when not pressed. In the first disclosed embodiment 100-A, the double acting cylinder 302-A moves the arm 202 that raises and lowers the blade 108. In the second disclosed embodiment 100-B, the double acting cylinder 302-B rotates the guard 110-B.

Another switch 708 is electrically coupled 416-B to a 2-position valve 710 that controls the hydraulic flow of the circuit 720 to the motor 204. In one embodiment, the switch 708 is a momentary toggle switch that defaults to OFF, with a latch that allows it to remain fixed in the ON position. In another embodiment, the operator must continuously press a joystick button or other activation mechanism in order to maintain the switch 708 in an ON position.

Figure 8:
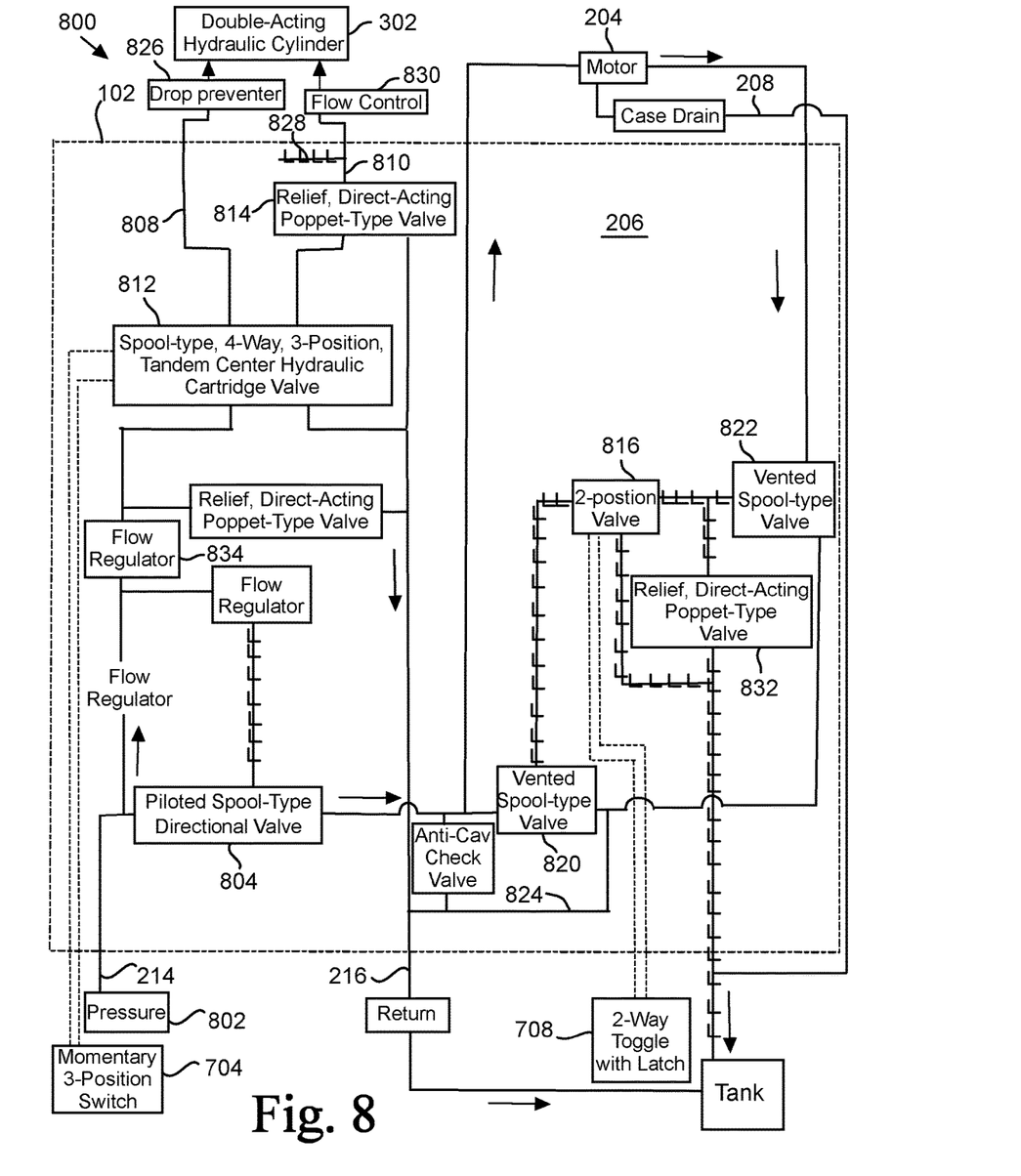
FIG. 8 is a detailed diagram of an electrical and hydraulic control system for an embodiment.

FIG. 8 illustrates one detailed version 800 of the simplified control diagram 700 disclosed in FIG. 7. The version 800 is equally applicable to the first two displayed attachments 100-A, 100-B, and in fact identical hydraulic components are capable of being used in either of the displayed attachment embodiments 100-A, 100-B.

The house 102 contains multiple valves and regulators configured to allow a single hydraulic circuit 206 to power both the motor 204 and the double-acting cylinder 302. In one embodiment, the displayed valves and regulators in the house 102 are engineered into a singe solid block. In one embodiment, the displayed valves and regulators in the house 102 are accessible from top lids 212, 128.

Hydraulic origin pressure 802 is constant. In one embodiment, the pressure 802 is 4000 PSI and up to 40 gallons per minute. The auxiliary hydraulic circuit 206 is coupled to the double-acting hydraulic cylinder 302. In the displayed embodiment, a flow regulator 834 reduces the hydraulic flow such that only a fraction of the hydraulic circuit flow reaches the hydraulic cylinder 302.

A first line 808 is coupled to the "up" actuation of the cylinder 302. A second line 810 is coupled to the "down" actuation of the cylinder 302. The 3-way switch 704 is electrically coupled to the 3-position valve 812, which controls the flow direction in the lines 808, 810 coupled to the cylinder 302.

In the event that the cylinder 302 controlling the arm 202-A encounters a sudden unexpected resisting force (e.g., the spinning blade 108 is suddenly forced upward, or the operator tries to push the arm 202-A downward with too much force), the "down" line 810 includes a relief valve 814 that couples directly to the return line 216. Thus, the downward force of the cylinder 302 has a maximum value, in order to prevent damage to the blade 108, arm 202-A, cylinder 302-A, and other components.

The "down" line 810 also includes a flow control 830 outside of the house 102. The flow control 830 is one direction, that is, during the downward actuation of the cylinder 302. The flow control 830 limits the speed with which the "down" actuation of the cylinder 302 can move. Note that the "up" line 808 includes neither a flow control nor a separate relief valve, because the operator may sometimes need to move the arm 202-A up swiftly and with great force if, for example, the blade 108 is stuck in a surface it is cutting.

The "up" line 808 includes a drop preventer 826. The drop preventer 826 stops the slow leaking of hydraulic fluid out of the "up" actuation of the cylinder 302 when the hydraulic pump is not operating, thereby preventing the arm 202-A from slowly dropping when the hydraulic pump is off or the first line 808 is otherwise inactive. The drop preventer 826 allows fluid to flow out of the cylinder 302 through the first line 808 when the second line 810 has fluid flowing into the cylinder 302, thereby activating a control line 828. In one embodiment, the drop preventer 826 includes a check valve with a bypass activated by the control line 828.

Flow bypasses the motor 204 unless the hydraulic circuit exerts sufficient pressure on the piloted pool-type directional valve 804. The toggle 708 is electrically coupled to a 2-way valve 816, which regulates flow. The valve 816 allows flow to either a first 820 or second 822 vented valve. When the second vented valve 822 is activated, the hydraulic flow powers the motor 204. When the second vented valve 822 is shut, flow to the motor 204 is cut off. Note that the second valve 822 is located on the circuit 206 after the motor 204, thereby allowing hydraulic pressure to be maintained in the motor 204 and preventing a vacuum in the motor 204 even when flow through the motor 204 has ceased. When the first vented valve 820 is activated, the hydraulic flow is directed to a return line 824 rather than the motor 204.

When the motor control 708 is switched from the on position to the off position, a control valve 832 allows the motor 204 and blade 108 to continue spinning until pressure has dropped below a predetermined amount. In one embodiment, the predetermined amount is 3000 psi. When pressure is below 3000 psi, the flow powering the motor 204 is substantially slowed and halted, and as a result the blade 108 ceases to spin.

From the foregoing description, it will be recognized by those skilled in the art that a safe skid steer attachment capable of cutting horizontal, raised, and vertical surfaces is provided. While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for cutting a surface, said apparatus comprising:
a house, said house is configured for attachment to the front of a skid steer, said house includes a leading end distal from said skid steer, said house having a wedge shape wherein said leading end is thinner than an opposite end proximate the skid steer, said house includes front and rear wheels, said front wheels disposed proximate said leading end of said house, said house coupled to a pair of lift arms extending from the skid steer, said house coupled to a first cylinder extending from the skid steer, whereby said lift arms move said house vertically and said first cylinder rotates said house, said house having a width at least as wide as the distance between said pair of lift arms extending from the skid steer, said house having a top face that extends from said leading end to said opposite end;
a blade, wherein an arm couples said blade to said house, said arm positioning said blade such that a portion of said blade that is positioned to cut the surface is proximate said leading end when said blade is cutting the surface;
a second cylinder, said second cylinder is coupled to said arm and said house, said cylinder is double actuating, said cylinder is configured to raise and lower said arm; and
a motor, said motor powers said blade, said motor and said second cylinder operate independently of one another.

2. The apparatus of claim 1, further comprising a guard, said guard is coupled to said blade, said guard shrouds a portion of said blade extending above said top face of said house, whereby said guard and said house collectively shield the skid steer from debris produced when said blade is cutting the surface.

3. The apparatus of claim 1, further comprising a first hydraulic circuit, said first hydraulic circuit includes a pressure line and a return line configured to connect to the skid steer, said first hydraulic circuit further includes said second cylinder and said motor.

4. The apparatus of claim 3, wherein said first hydraulic circuit includes a relief valve coupled to said second cylinder and to said return line, said relief valve is configured to redirect a flow in said first hydraulic circuit from said second cylinder to said return line when said second cylinder is actuated to lower said arm and a hydraulic pressure exerted on said second cylinder exceeds a predetermined pressure.

5. The apparatus of claim 1, said blade is a spinning blade, wherein the weight of said housing, said blade, said second cylinder, and said motor is sufficient to prevent said house from lifting off of said surface when said spinning blade contacts an uncuttable material.

6. The apparatus of claim 1, said guard consists of a front portion and a rear portion connected by a hinge, said front portion is capable of pivoting on said hinge such that said front portion does not cover any portion of said blade.

7. The apparatus of claim 6, said front portion covers a sufficient portion of said blade such that said front portion blocks said blade from rolling away from said apparatus if said blade decouples from said arm during use.

8. The apparatus of claim 1, wherein a plane defined by said blade is positioned between said pair of lift arms of said skid steer when said house is coupled to said pair of lift arms of said skid steer, and said blade passing through a channel extending from said leading end in said top face of said house.

9. The apparatus of claim 1, further including at least one step protruding from said top face of said house whereby said at least one step provides access to the skid steer when said house is coupled to the skid steer.

10. An attachment for a skid steer where the skid steer includes a pair of lifting arms, at least one first cylinder, and a hydraulic pump, said attachment comprising:
a house, said house is configured to couple to the pair of lifting arms on the skid steer, said house is configured to couple to the at least one first cylinder of the skid steer, said house is raised and lowered relative to the skid steer by the pair of lifting arms, said house is rotated relative to the skid steer by the at least one first cylinder, said house having a wedge shape tapering at a leading end that is distal to an opposite end where the skid steer is coupled to said housing, said housing having a top face extending from said leading end toward said opposite end of said house;
a pair of front wheels disposed proximate said leading end of said house, said pair of front wheels positioned to support said leading end relative to a surface;
an arm, said arm having a first end that is coupled to said house;
a blade, said blade is coupled to said arm;
a motor, said motor powers said blade;
a guard, said guard is coupled to said blade, said guard covers a portion of said blade; and
a second cylinder, said second cylinder is coupled to said arm and said house, said cylinder is double actuating to rotate said arm in two directions.

11. The attachment of claim 10, wherein said second cylinder and said motor are configured to be powered by the hydraulic pump when the attachment is connected to the skid steer, and said second cylinder and said motor independently operable.

12. The attachment of claim 10, said attachment is operable to cut the surface when the surface is horizontal.

13. The attachment of claim 10, said guard includes a front portion and a rear portion connected by a hinge, said front portion is capable of pivoting on said hinge such that said front portion does not cover any portion of said blade.

14. The apparatus of claim 10, wherein said arm positions said blade such that a portion of said blade that is positioned to cut the surface is proximate said leading end when said blade is cutting the surface whereby a selected cutting depth is maintained with said front wheels positioned on the surface.

15. The apparatus of claim 10, wherein said housing has a width that is greater than the distance between said pair of lift arms of the skid steer.

16. The apparatus of claim 10, wherein said blade is positioned medially relative to said house, and said blade passes through a channel extending from said leading end in said top face of said house.

17. The apparatus of claim 10, further including at least one step protruding from said top face of said house whereby said at least one step provides access to the skid steer when said house is coupled to the skid steer.

\* \* \* \* \*